United States Patent
Katano et al.

(10) Patent No.: US 9,076,479 B2
(45) Date of Patent: Jul. 7, 2015

(54) MAGNETIC RECORDING MEDIUM

(71) Applicant: FUJI ELECTRIC CO., LTD., Kawasaki-shi (JP)

(72) Inventors: Tomonori Katano, Matsumoto (JP); Akiyasu Kumagai, Matsumoto (JP); Katsumi Taniguchi, Matsumoto (JP); Hiromi Ono, Matsumoto (JP); Narumi Sato, Matsumoto (JP); Shinji Uchida, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 13/965,140

(22) Filed: Aug. 12, 2013

(65) Prior Publication Data

US 2014/0065445 A1    Mar. 6, 2014

(30) Foreign Application Priority Data

Aug. 30, 2012 (JP) ................................. 2012-190414

(51) Int. Cl.
  G11B 5/66 (2006.01)
  G11B 5/725 (2006.01)
  G11B 5/72 (2006.01)
  G11B 5/84 (2006.01)

(52) U.S. Cl.
  CPC *G11B 5/725* (2013.01); *G11B 5/72* (2013.01); *G11B 5/8408* (2013.01)

(58) Field of Classification Search
  USPC .............. 428/835, 835.1, 833.1, 833.2, 835.2
  See application file for complete search history.

(56) References Cited

U.S. PATENT DOCUMENTS

| 5,871,841 | A | 2/1999 | Kuratomi |
| 6,358,636 | B1 * | 3/2002 | Yang et al. ................. 428/833.2 |
| 6,572,958 | B1 * | 6/2003 | Chour et al. .................. 428/213 |
| 6,660,413 | B1 * | 12/2003 | Thangaraj et al. ......... 428/833.2 |
| 7,491,418 | B2 * | 2/2009 | Isozaki ......................... 427/127 |
| 2001/0031382 | A1 | 10/2001 | Kusakawa et al. |
| 2005/0284842 | A1 * | 12/2005 | Okawa et al. .................... 216/22 |

(Continued)

FOREIGN PATENT DOCUMENTS

| JP | S61-222024 | 10/1986 |
| JP | H09-138943 | 8/1997 |

(Continued)

OTHER PUBLICATIONS

John Robertson, "The deposition mechanism of diamond-like a-C and a-C:H", Diamond and Related Materials, 3rd Ed., (1994), pp. 361-368.

*Primary Examiner* — Holly Rickman
(74) *Attorney, Agent, or Firm* — Rabin & Berdo, P.C.

(57) ABSTRACT

A magnetic recording medium includes a substrate having sequentially formed thereon (a) a magnetic layer; (b) a protective layer having a thickness ranging from 1.0 nm to 2.5 nm and being composed of an amorphous metal layer having a thickness of at least 0.3 nm, the amorphous metal layer being composed of a metal selected from the group consisting of Si, Al, Ge, Ti, Zr, Hf, V, Nb, Ta, Cr, Mo and W that is in an amorphous state; (c) a carbon layer formed on the amorphous metal layer and having a thickness of at least 0.3 nm, the carbon layer including amorphous carbon; and (d) a lubricating layer, wherein the carbon layer includes nitrogen atoms in a surface thereof in which a ratio of number of nitrogen atoms to total number of carbon atoms, nitrogen atoms, and oxygen atoms is 14 atomic % or less.

3 Claims, 5 Drawing Sheets

(56) References Cited

U.S. PATENT DOCUMENTS

| | | | |
|---|---|---|---|
| 2007/0087227 A1* | 4/2007 | Ma et al. | 428/833.1 |
| 2008/0176108 A1 | 7/2008 | Cheng et al. | |
| 2008/0187781 A1 | 8/2008 | Cheng et al. | |
| 2008/0231992 A1 | 9/2008 | Cheng et al. | |
| 2013/0034746 A1* | 2/2013 | Katano et al. | 428/833.2 |

FOREIGN PATENT DOCUMENTS

| | | |
|---|---|---|
| JP | 2001-266328 A | 9/2001 |
| JP | 2008-176915 A | 7/2008 |
| JP | 2008-192288 A | 8/2008 |
| JP | 2008-234828 A | 10/2008 |

* cited by examiner

EVALUATION EXAMPLE 3:
  RESULTS OF EVALUATING MAGNETIC HEAD FLYABILITY

AMORPHOUS METAL LAYER FILM THICKNESS (nm)

EVALUATION EXAMPLE 3:
 RESULTS OF EVALUATING CORROSION RESISTANCE

MAGNETIC RECORDING MEDIUM

CROSS-REFERENCE TO RELATED APPLICATION(S)

This non-provisional application claims the benefit of the priority of Applicant's earlier filed Japanese Patent Application Laid-open No. 2012-190414 filed Aug. 30, 2012, the entire contents of which are incorporated herein by reference.

BACKGROUND OF THE INVENTION

1. Field of the Invention

The present invention relates to a magnetic recording medium that is used in an information recording apparatus of information processing equipment such as a computer or a recording apparatus of a consumer product. More particularly, the present invention relates to a magnetic recording medium used in a hard drive.

2. Description of the Related Art

With the recent increase in the amount of information handled by computers and other information processing equipment as well as downsizing of such information processing equipment, the storage capacities of the information recording apparatuses have increased, and the storage capacities required in magnetic recording media used in the information recording apparatuses keep steadily increasing.

FIG. 2 shows a cross-sectional schematic diagram of a magnetic recording medium. This magnetic recording medium 1 is generally configured by a substrate 2, a magnetic layer 3 on which information is recorded by a magnetic head, a protective layer 4 for protecting the magnetic layer from corrosion, wear, shock, and the like, and a lubricating layer 5 covering the surface of the protective layer 4. For the purpose of increasing the storage capacity of this magnetic recording medium and improving its recording performance, the distance between a read/write element of the magnetic head and the magnetic layer 3 of the magnetic recording medium, which is, in other words, a magnetic spacing, needs to be reduced to the utmost. The magnetic spacing is formed by the thickness of a protective layer of the magnetic head, the flying height of the magnetic head, and the thicknesses of the protective layer 4 and the lubricating layer 5 of the magnetic recording medium. A challenge of development of the magnetic recording medium is to reduce the thickness of the protective layer 4. Amorphous carbon called diamond-like carbon (DLC) has been generally used as the protective layer 4 of the magnetic recording medium.

A current magnetic recording medium has a recording density of approximately 500 gigabits/square inch, and the thickness of the protective layer 4 of the magnetic recording medium is more than 2.5 nm but not more than 3.5 nm. In order to increase the recording density to 750 gigabits/square inch or more in the future, it is considered that the magnetic spacing needs to be 8.5 nm or less. Considering the breakdown, the thickness of the protective film of the magnetic head needs to be 2 nm or less, the space between the outermost surface of the magnetic head and the outermost surface of the magnetic recording medium (flying height of the head) needs to be approximately 3 nm, the thickness of the lubricating layer of the magnetic recording medium needs to be 1 nm, and the thickness of the protective layer of the magnetic recording medium needs to be 2.5 nm or less. Increasing the recording density to 2000 gigabits/square inch in the future means that the thickness of the protective layer needs to be 1 nm.

On the other hand, the protective layer of the magnetic recording medium needs to be highly reliable. In other words, the protective layer needs to have sufficient corrosion resistance, sliding durability, and magnetic head flyability. The same level of reliability is required when reducing the thickness of the protective layer. However, if the protective layer of DLC made by a conventional method has a thickness of 2.5 nm or less, the properties described above are not reliable enough.

In order to address the issues described above, Japanese Patent Application Publication No. H9-138943 proposes the following. An underlayer made of Si, Ge, Sn, and the like is interposed between a magnetic film and a protective film, and the thus obtained layer is used as a buffer film to reduce residual strain of the protective film which is a carbon layer. This configuration can improve sliding durability of the magnetic medium and reduce the thickness of the protective layer, i.e., the integration of the buffer film and the protective film. Nevertheless, the thickness of the protective layer remains 5 nm, e.g., 7 in Example 2 of Japanese Patent Application Publication No. H9-138943, which still is too thick to achieve a target thickness of 2.5 nm or less. Moreover, it is admitted that theoretically speaking, the sum of the film thickness of the buffer film and the protective film at which the strain of the protective film is alleviated is over approximately 2.5 nm. Again, the configuration described in Japanese Patent Application Publication No. H9-138943 is not adequate to practically realize a film thickness equal to or less than 2.5 nm, see paragraph 0017 of Japanese Patent Application Publication No. H9-138943.

Japanese Patent Application Publication No(s). 2008-176915, 2008-192288, and 2008-234828 similarly propose double protective layers excellent in abrasion resistance and corrosion resistance. According to these patent documents, an aluminum oxynitride, a silicon oxynitride, and an oxynitride containing transition metals of Ti, Zr, Hf, V, Nb, Ta, Cr, Mo, and W are proposed as underlayers. Each of these underlayers can compensate for the stress of a protective film which is a carbon layer, so that the carbon layer can effectively adhere to a magnetic layer, achieving strong and stable bonding therebetween.

The issue in each of these patent documents, however, is that in the region where the thickness is reduced to 2.5 nm or less, the protective layer has micro-level coarseness. This causes a film thickness distribution in the lubricating layer and makes the magnetic head flyability unstable.

In addition, the DLC film needs to be denser in order to realize corrosion resistance and sliding durability in the thin protective layer. For example, according to Diamond and Related Materials, $3^{rd}$ Ed., (1994), pgs. 361-368 by J. Robertson, a dense film with high $sp^3$ bonding properties was developed by optimizing the energy of carbon ions generated by a plasma or by a high plasma density processing.

On the other hand, a dense DLC film of high corrosion resistance has high water repellency and provides less interactions, such as hydrogen bonding, chemical bonding, and polar interactions, with a terminal group of a lubricant. For this reason, the lubricant is known to have poor binding with the protective layer which is the DLC film. According to Japanese Patent Application Publication No. S61-222024, the protective film thereof with high corrosion resistance is defined by a water contact angle by taking advantage of the fact that the denser the film is, the higher the water repellency thereof. However, applying the lubricant to the protective layer when the bonding between the lubricant and the protective layer is poor, increases the ratio of non-bonded lubricant thickness to the total applied thickness, and, in a subsequent head flyability test, the non-bonded lubricant easily flows around the head in response to a wind pressure generated when the head flies, lowering the lubricity of a part where the head flies or preventing the head from flying stably due to transfer of the lubricant thereto.

As a countermeasure against such issues, Japanese Patent Application Publication No. 2001-266328, for example, describes that performing a nitrogen plasma treatment on the surface of the protective layer or an extremely shallow region from this surface, can reduce the contact angle of water to the protective layer, i.e., the water repellency of the protective layer. The nitrogen plasma treatment is a method for taking active nitrogen ions or nitrogen radicals into the surface of the protective layer by generating a plasma in a chamber into which nitrogen gas is introduced, in order to reduce the water repellency of the protective layer. The issues here are the film thickness of the protective layer and deterioration of the protective layer caused by the nitrogen plasma treatment. When the protective layer is as extremely thin as 2.5 nm or less, the nitrogen plasma treatment has an impact not only on the outermost surface of the protective layer but also on the entire protective layer. Therefore, the most part of the protective layer becomes damaged by the nitrogen plasma treatment, deteriorating the denseness and corrosion resistance of the protective layer. However, toning down the nitrogen plasma treatment weakens the adhesion of the lubricant, resulting in trade-off relationship where the protective layer is damaged or the head flies unstably. The prior art described above are verified only when the thickness of the protective layers exceeds 2.5 nm, which means that the entire protective layers cannot be damaged.

An object of the present invention, therefore, is to improve the recording performance by further reducing the thickness of the protective layer of the magnetic recording medium.

SUMMARY OF THE INVENTION

In order to achieve the object described above, a first aspect of the present invention provides a magnetic recording medium having the following configurations.

The present invention provides a magnetic recording medium, comprising: a substrate having sequentially formed thereon, in the order recited, a magnetic layer; a protective layer having a thickness ranging from 1.0 nm to 2.5 nm and being comprised of an amorphous metal layer having a thickness of at least 0.3 nm formed on the magnetic layer, and a carbon layer comprised of amorphous carbon having a thickness of at least 0.3 nm formed on the amorphous metal layer; and a lubricating layer, wherein the carbon layer includes nitrogen atoms in a surface thereof in which a ratio of number of nitrogen atoms to total number of carbon atoms, nitrogen atoms, and oxygen atoms is 14% or less.

In a second aspect, the present invention provides a method for manufacturing the recording medium of the first aspect.

A method for manufacturing the recording medium of the first aspect comprises the steps of: preparing a substrate; forming a magnetic layer on the substrate; forming an amorphous metal layer on the magnetic layer; forming a carbon layer on the amorphous metal layer; performing a nitrogen plasma treatment on a surface of the carbon layer that is effective to adjust a ratio of number of nitrogen atoms to total number of carbon atoms, nitrogen atoms, and oxygen atoms in the carbon layer to 14% or less and to provide a nitrogen-plasma-treated carbon layer; forming a lubricating layer on the nitrogen-plasma-treated carbon layer; and performing a tape burnishing treatment on a surface of the lubricating layer.

The present invention provides a magnetic recording medium that has excellent magnetic head flyability and is highly reliable even when the thickness of the protective layer is reduced to 2.5 nm or less.

In addition, according to the method for manufacturing the magnetic recording medium of the invention of the present application, controlling the nitrogen plasma treatment of the surface of the carbon layer allows the subsequent tape burnishing treatment to easily remove the particles generated accompanying the formation of the carbon layer. Therefore, magnetic head flyability can be secured and a highly reliable magnetic recording medium can be produced. As a result, protective film technology that can be applied to a recording density of 2000 gigabits/square inch described above can be realized in an actual mass production process.

DETAILED DESCRIPTION OF THE INVENTION

Figure 1:
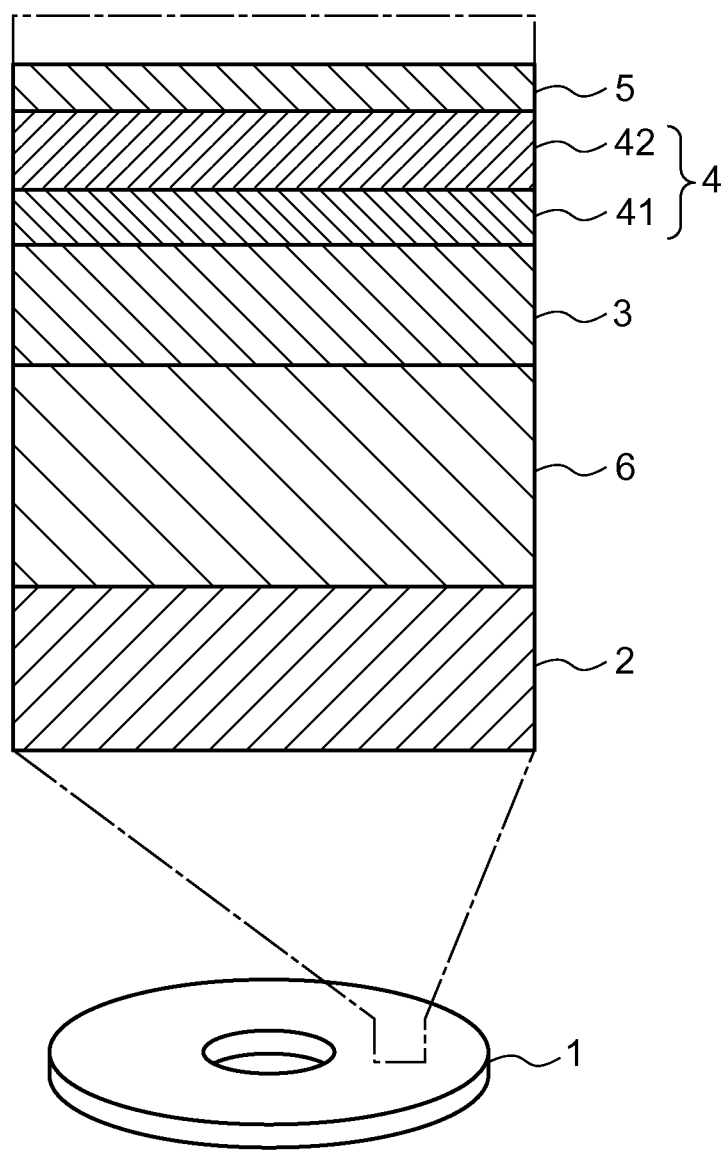
FIG. 1 is a cross-sectional schematic diagram showing a configuration example of a magnetic recording medium of the present invention.
Figure 2:
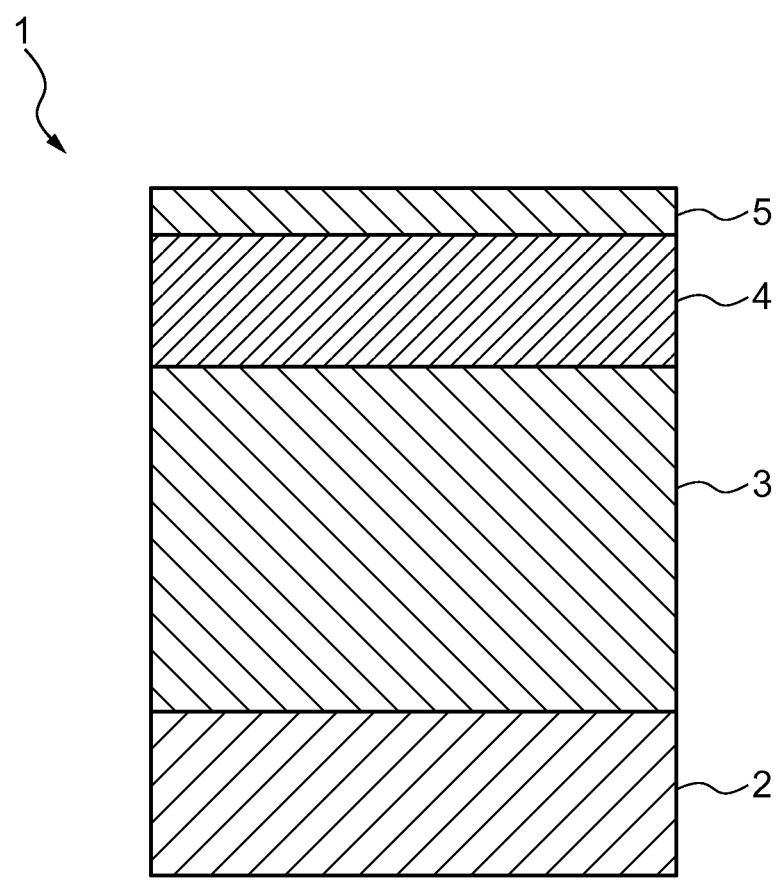
FIG. 2 is a cross-sectional schematic diagram showing a conventional magnetic recording medium.

First Aspect of the Present Invention
(1) Basic Configuration:

A magnetic recording medium according to a first aspect, into/from which information is written/read using a magnetic head, is configured by sequentially forming on a substrate a magnetic layer made of a magnetic material, a protective layer for protecting the magnetic layer, and a lubricating layer for covering a surface of the protective layer. The protective layer has a stacked configuration of an amorphous metal layer and a carbon layer.

The inventors achieved the present invention by discovering the knowledge described below. When reducing the thickness of the protective layer to 2.5 nm or less, forming a carbon layer as the protective layer directly on the magnetic layer, without forming the amorphous metal layer of the present invention, cannot completely cover the protective layer due to a large interfacial energy difference between the surface of the magnetic layer and the carbon layer. Consequently, a part of the magnetic layer becomes exposed. Due to the presence of such an exposed part in the magnetic layer, corrosion resistance of the magnetic recording medium becomes deteriorated.

With regard to a state of bonding between the carbon layer or the magnetic layer and a lubricant included in the lubricating layer, the lubricant binds better with the surface of the magnetic layer than with the surface of the carbon layer. Hence, the lubricant basically concentrates on the exposed surface of the magnetic layer. Reducing the average film thickness of the lubricating layer to, for example 1.0 nm or less makes the lubricating layer on the surface of the carbon layer extremely thin.

A nitrogen plasma treatment can be performed on the surface of the protective layer in order to enhance the bonding properties of the lubricant to the surface of the carbon layer. In a weak nitrogen plasma treatment, the exposed part of the magnetic layer reacts to the nitrogen plasma treatment more sensitively than the surface of the carbon layer, causing the lubricant of the lubricating layer to concentrate easily on the exposed surface of the magnetic layer. In a strong nitrogen plasma treatment, the bonding between the surface of the carbon layer and the lubricant is improved, and consequently the film thickness distribution of the lubricating layer is relaxed. However, the nitrogen plasma treatment has an impact not only on the outermost surface of the carbon layer but also on the entire protective layer. Therefore, the majority of the carbon layer becomes damaged by the nitrogen plasma treatment, deteriorating its denseness and corrosion resistance.

Particles that are deposited on a disk during a step of producing the disk have a tendency to adhere to a part where the lubricant is thin. The particles adhering to the part where the lubricant is thin cannot be removed easily by a tape burnishing treatment, increasing the risk of creating scratches on the disk. Strong friction occurs between the protective layer and the cleaning tape in the part where the lubricant is thin, due to the lack of lubricant, increasing the risk of creating scratches on the disk. Note that the tape burnishing treatment here means a process of pushing a polishing tape against a rotating recording medium to remove particles or microprojections.

It was found that, as described above, forming a carbon layer of 2.5 nm or less as a protective layer on the magnetic layer directly is not preferred in terms of the magnetic head flyability.

As a result of the various studies on the factors described above, the inventors discovered that forming an amorphous metal layer on the magnetic layer and then a carbon layer thereon reduced the area of exposed sections on the magnetic layer due to a small interfacial energy differences between the magnetic layer and the amorphous metal layer and between the amorphous metal layer and the carbon layer. The state of bonding between the surface of the carbon layer and the lubricant was substantially the same as the state of bonding between the surface on the amorphous metal layer and the lubricant. Thus, even when the amorphous metal layer was exposed, the lubricant of the lubricating layer does not concentrate on the exposed amorphous metal layer. Therefore, the film thickness distribution of the lubricating layer was low and the lubricating layer on the surface of the carbon layer does not become extremely thin, even when the average film thickness of the lubricating layer was reduced to, for example, 1.0 nm or less.

In a case in which the surface of the protective layer is subjected to nitrogen plasma treatment, the surface of the carbon layer and the surface of the amorphous metal layer react in substantially the same way to the nitrogen plasma treatment. For this reason, the lubricant of the lubricating layer does not concentrate on the exposed amorphous metal layer, lowering the film thickness distribution of the lubricating layer. Consequently, the lubricating layer on the surface of the carbon layer does not become extremely thin even when the average film thickness of the lubricating layer is reduced to, for example, 1.0 nm or less.

Introducing an appropriate amount of nitrogen into the carbon layer can suppress adverse effects on $sp^3$ bonding of the carbon layer, realizing a carbon layer having corrosion resistance, sliding durability, and the like.

The present invention is based on the above and is now described hereinafter in more detail.

(2) Protective Layer:

The protective layer is a layer for protecting the magnetic layer from corrosion, wear, shock, and the like.

The protective layer of the present invention includes an amorphous metal layer formed on the magnetic layer and a carbon layer formed on the amorphous metal layer.

(2-1) Carbon Layer:

(2-1-1):

The carbon layer is formed of amorphous carbon and is relatively thin but has high wear resistance. Amorphous carbon is an amorphous carbon material, and a diamond-like carbon (DLC) is favorably used as the amorphous carbon.

The carbon layer can be formed by, for example, a sputtering method, an arc ion plating method, a plasma enhanced chemical vapor deposition (plasma CVD) method, and the like. When introducing hydrogen atoms into the carbon layer, a plasma CVD method using a carbon hydrogen gas source, such as ethylene or acetylene, or using a hydrocarbon liquid source, such as xylene, toluene, or benzene, is used for forming the carbon layer. Plasma used in the plasma CVD method can be selected depending on the application thereof, such as a parallel plate method, an inductively coupled plasma (ICP) method, an electron cyclotron resonance (ECR) method, and an electron cyclotron wave resonance (ECWR) method. Because the plasma CVD method uses source gas containing hydrogen, a fair amount of hydrogen atoms remain in the carbon layer. The concentration of the hydrogen atoms in the carbon layer is preferably low in view of obtaining a dense film of high $sp^3$ bonding. In order to lower the concentration of the hydrogen atoms in the carbon layer, the carbon layer can be formed using the arc ion plating method or a filtered cathodic arc (FCA) method, which is a type of the arc ion plating method.

The carbon layer can have a stacked configuration. Layers having different hydrogen concentrations can be stacked or the hydrogen concentrations can continuously be changed in order to exert desired characteristics of the carbon layer.

(2-1-2):

Nitrogen atoms are introduced into the carbon layer according to the present invention in order to enhance the bonding between the surface of the carbon layer and the lubricant of the lubricating layer. The nitrogen atoms can be introduced by introducing, for example, nitrogen gas into a plasma source and performing a nitrogen plasma treatment on the surface of the carbon layer. In view of enhancing the bonding between the carbon layer and the lubricant, it is preferred that an outer layer of the carbon layer contain nitrogen atoms. More preferably, the ratio of the number of nitrogen atoms to a total number of carbon atoms, nitrogen atoms, and oxygen atoms in the surface of the carbon layer is 3 atomic % or more. Excessive nitrogen in the carbon layer has an adverse effect on the $sp^3$ bonding in the carbon layer, resulting in an inhibition of the denseness of the carbon layer and a deterioration of the corrosion resistance and sliding durability of the same. In the case in which the film thickness of the protective layer exceeds 2.5 nm as in a conventional protective layer configured only by a carbon layer, a deep part of the protective layer partially has high $sp^3$ bonding even when excessive nitrogen atoms are introduced to the outer layer of the carbon layer. Thus, corrosion resistance and sliding durability can be ensured in such a case. However, when the thickness of the protective layer is thinner than 2.5 nm, introducing nitrogen atoms into the carbon layer has an adverse effect on the entire carbon layer, which is the protective layer. Therefore, the ratio of the number of nitrogen atoms in the outer layer of the carbon layer is preferably 14 atomic % or less or more preferably 10 atomic % or less, in terms of obtaining a dense film with high sp³ bonding.

Occurrence of scratches, for example, during the tape burnishing treatment can be eliminated by introducing an appropriate amount of nitrogen atoms into the outer layer of the carbon layer. However, the carbon layer becomes extremely thin when attempting to further reduce the film thickness of the protective layer, i.e., the total film thickness of the amorphous metal layer and the carbon layer, by using a combination of the amorphous metal layer and the carbon layer as the protective layer of the present invention. For this reason, a part of the surface of the amorphous metal layer is exposed, because the surface of the protective layer on the lubricating layer does not completely form the carbon layer surface. It is difficult to completely conform the state of bonding between the surface of the amorphous metal layer and the lubricant of the lubricating layer, with the state of bonding between the surface of the carbon layer and the lubricant. Thus, these states of bonding fluctuate slightly, causing a distribution in the film thickness of the lubricating layer. Moreover, because the surface of the amorphous metal layer and the surface of the carbon layer are considered to react differently to the nitrogen plasma treatment, the film thickness distribution of the lubricating layer increases, depending on the conditions of the nitrogen plasma treatment. On the other hand, some of the particles that are generated during the formation of the carbon layer have a tendency to adhere easily to a portion where the lubricant is thin. When the film thickness distribution of the lubricating layer becomes large, the tape burnishing treatment is not enough to remove the particles adhering to the thin portion, increasing the risk of creating scratches. As a result of the studies by the inventors, it was found that such issues can be prevented by appropriately controlling the ratio of the number of nitrogen atoms introduced into the outer layer of the carbon layer, by using a nitrogen plasma treatment. Specifically, the nitrogen plasma treatment for setting the ratio of the number of nitrogen atoms at 14 atomic % or less can prevent the generation of scratches caused in the tape burnishing treatment.

(2-2) Amorphous Metal Layer:

An amorphous metal layer is formed between the magnetic layer and the carbon layer as a part of the protective layer. Even when the amorphous metal layer is relatively thin, it has high coverage on the magnetic layer and therefore can improve the corrosion resistance of the magnetic layer. The amorphous metal layer is preferably formed of amorphous metal, in terms of enhancing its coverage on the magnetic layer by its relatively small thickness and improving the corrosion resistance by itself. Furthermore, at least one kind of amorphous material selected from the group consisting of Si (silicon), Al (aluminum), Ge (germanium), Ti (titanium), Zr (zirconium), Hf (hafnium), V (vanadium), Nb (niobium), Ta (tantalum), Cr (chromium), and W (tungsten), which are highly active to oxygen, is favorably used in order to prevent oxidation of the magnetic layer. It is preferred that C, O, or N be added to these amorphous metals in order to enhance the sliding durability and corrosion resistance of the magnetic layer.

The amorphous metal layer can have a stacked configuration. The amorphous metal layer can be formed by stacking layers of different materials. Alternatively, two or more materials with different ratios may be stacked, or the ratios of these materials may continuously be changed, to form the amorphous metal layer.

The amorphous metal layer can be formed using, for example, a sputtering method performed at room temperature.

(2-3) Film Thickness of the Protective Layer:

The thickness of the protective layer is the total thickness of the carbon layer and the amorphous metal layer.

The thickness of the carbon layer is preferably equal to or greater than 0.3 nm, or more preferably equal to or greater than 0.5 nm, in terms of maintaining effective wear resistance and corrosion resistance to protect the magnetic layer and enhance the coverage on the amorphous metal layer.

The thickness of the amorphous metal layer is preferably equal to or greater than 0.3 nm, or more preferably equal to or greater than 0.5 nm, in terms of enhancing the coverage on the magnetic layer.

The thickness of the protective layer, which is the total thickness of the carbon layer and the amorphous metal layer, is preferably 1 nm or more. On the other hand, in terms of improving the recording density of the magnetic recording medium, the total film thickness of the protective layer is preferably equal to or less than 2.5 nm, or more preferably equal to or less than 2 nm.

In the present invention, controlling the ratio of the number of nitrogen atoms in the surface of the carbon layer can realize a sufficiently reliable magnetic recording medium, even when the thickness of the protective layer is 2.5 nm or less, as described in (2-1-2) above.

(3) Magnetic Layer:

The magnetic layer is a layer for maintaining magnetic recording, and a conventionally-known configuration can be used in the magnetic layer. The magnetic layer may be configured by stacking multiple layers such as an underlayer, a soft magnetic underlayer, a seed layer, an intermediate layer, and a magnetic recording layer. Alternatively, the layers described above may be configured by stacking more of the multiple layers, such as a multiple underlayer.

Any known material can be used as the material of the magnetic layer. Preferred examples include a granular film that is obtained by adding a non-magnetic oxide, such as $SiO_2$ or $TiO_2$, to an alloy composed mainly of Co. More specifically, examples of the material used in the magnetic layer include a CoCrPt—$SiO_2$ granular film, which can be formed by means of sputtering. A granular film that is obtained by adding a non-magnetic material, such as C, $SiO_2$, or $TiO_2$, to an alloy composed mainly of FePt can be used as a favorable material of a high Ku magnetic material.

Any of the magnetic layers described above can be formed by means of sputtering. The thickness of the magnetic layer is preferably 10 to 100 nm, in terms of reading magnetic signals.

(4) Lubricating Layer:

The lubricating layer is a layer for providing the magnetic recording medium with lubricity when the magnetic head is in contact therewith. The lubricating layer can be formed on the substrate by using any liquid lubricant material that is known in the art. Specifically, a perfluoropolyether based lubricant (PEPE) is preferably used. The lubricant can be applied into a film thickness of approximately 1 nm by means of a dip-coating method or a spin-coating method. Specific examples of the liquid lubricant include Fomblin-Z-tetraol (manufactured by Solvay Solexis) and A20H (manufactured by MORESCO Corporation).

(5) Substrate:

Any non-magnetic substrate, such as glass, ceramic, aluminum, titanium, silicon, or plastic, can be used as the substrate used in the present invention. Above all, a glass substrate, an aluminum substrate, or an aluminum alloy substrate is preferably used. An aluminum substrate or an aluminum alloy substrate that has a plated surface is particularly preferred.

Second Aspect of the Present Invention (1) Basic Configuration:

The second aspect is a method for manufacturing the recording medium of the first aspect and has a step of preparing a substrate, a step of forming the magnetic layer on the substrate, a step of forming the amorphous metal layer on the magnetic layer, a step of forming the carbon layer on the amorphous metal layer, a step of performing the nitrogen plasma treatment on the surface of the carbon layer, a step of forming the lubricating layer on the nitrogen-plasma-treated carbon layer, and a step of performing the tape burnishing treatment on the surface of the lubricating layer.

(2) Forming the Magnetic Layer, the Amorphous Metal Layer, and the Carbon Layer:

As described in the first aspect above, the magnetic layer is formed on the substrate by means of sputtering or the like, and the amorphous metal layer is formed on the magnetic layer in the same manner. Then, the carbon layer is formed on the amorphous metal layer by means of sputtering, arc ion plating, plasma CVD, or the like.

The film thickness of each of the layers can be controlled by adjustment of the time required for forming each of these layers.

When lowering the amount of hydrogen (atomic %) contained in the carbon layer, the arc ion plating method or, particularly, a filtered cathodic arc (FCA) method can be used to vacuum arc discharge between a cathode and an anode under a vacuum atmosphere, evaporate/ionize the material from a graphite target surface, and cause the ions to collide with the substrate to which a negative bias voltage is applied, as described in the first embodiment.

When positively introducing hydrogen atoms into the carbon layer, a plasma CVD method can be used to introduce hydrocarbon gas, which is a source of the carbon layer, into a vacuum container, apply a voltage to the cathode to form/decompose the gas into a plasma, and cause the resultant carbon ions to collide with the substrate by applying a negative bias voltage to the substrate, as described in the first embodiment. The amount of hydrogen contained in the carbon layer can be controlled by adjusting the level of power applied to the plasma and the pressure of the hydrocarbon gas. In other words, the amount of hydrogen contained in the carbon layer can be increased by lowering the level of power and raising the pressure of the hydrocarbon gas.

(3) Nitrogen Plasma Treatment on the Surface of the Carbon Layer:

Next, as described regarding the first aspect, the surface of the carbon layer is subjected to a nitrogen plasma treatment to introduce nitrogen atoms thereto, and the ratio of the number of nitrogen atoms to the total number of carbon atoms, nitrogen atoms, and oxygen atoms in the surface of the carbon layer is adjusted to 14 atomic % or less.

The ratio of the number of nitrogen atoms can be controlled by adjusting the RF power applied to the nitrogen plasma and the time required for performing the nitrogen plasma treatment. In other words, raising the RF power increases the ratio of the number of nitrogen atoms that are introduced to the surface of the carbon layer per unit time. However, excessively high RF power increases the penetration depth for the nitrogen atoms to enter the film, increasing the thickness of a damaged layer above the surface. On the other hand, excessively low RF power lowers the ratio of the number of nitrogen atoms per unit time. Moreover, even when the time for the nitrogen atoms to enter the film is extended when the outer layer lacks nitrogen atoms, the number of nitrogen atoms cannot be increased any more than what is already in the outer layer. For this reason, the level of the RF power needs to be controlled in an appropriate range for each device.

(4) Forming the Lubricating Layer and Performing the Tape Burnishing Treatment Thereon:

Subsequently, using a dip-coating method or a spin-coating method, the lubricating layer is formed on the surface of the carbon layer that has improved its bonding to the lubricant as a result of the nitrogen plasma treatment, as described in the first embodiment.

Thereafter, a tape burnishing treatment is performed in which a polishing tape is pressed against the rotating magnetic recording medium to smoothen the surface of the magnetic recording medium or remove the deposits on the surface. Before the tape burnishing treatment, the lubricating layer has particles or microprojections thereon, which are generated during the formation of the carbon layer. Not removing these particles or microprojections increases the risk of creating scratches on the magnetic recording medium, causing an adverse effect on the magnetic head flyability.

As described regarding the first aspect, whether the particles can be removed easily in the tape burnishing treatment depends on the ratio of the number of nitrogen atoms to the total number of carbon atoms, nitrogen atoms, and oxygen atoms in the surface of the carbon layer. In other words, when forming the lubricating layer without configuring the protective layer into a two-layer configuration of the amorphous metal layer and the carbon layer, the film thickness distribution of the lubricating layer becomes large to a point where it is difficult to use the tape burnishing treatment for removing the particles on a section where the lubricating layer is thin. This increases the risk of causing scratches and has an adverse effect on the magnetic head flyability. The thinner the film thickness of the carbon layer, the higher the chance that a part of the surface of the magnetic layer is exposed, the magnetic layer having different bonding with the lubricant and response to the nitrogen plasma treatment. Therefore, the film thickness distribution of the lubricating layer increases.

In the present invention, therefore, the film thickness distribution of the lubricating layer is suppressed by configuring the protective layer into the two-layer configuration of the amorphous metal layer and the carbon layer. Moreover, by controlling the ratio of the number of nitrogen atoms to a total number of carbon atoms, nitrogen atoms, and oxygen atoms in the surface of the carbon layer to 14 atomic % or less, the particles on the lubricating layer can easily be removed by the execution of the tape burnishing treatment even when the film thickness of the carbon layer configuring a part of the protective layer is reduced. Furthermore, maintaining excellent magnetic head flyability can ensure the reliability of the magnetic recording medium.

EXAMPLES

The present invention is described in further detail using the following examples.

The manufactured magnetic recording media were evaluated by the following methods.

Nitrogen Content in the Surface of the Protective Layer:

X-ray photoelectron spectroscopy (XPS) was used to measure the ratio of the number of nitrogen atoms to a total number of carbon atoms, nitrogen atoms, and oxygen atoms in the surface of the protective layer in each sample obtained prior to the formation of the lubricating layer. In other words, the number of atoms of each element was measured from the number of photoelectrons corresponding to the carbon, nitrogen and oxygen by using an XPS method, to calculate the ratio of the number of nitrogen atoms to the total number of these atoms. Given the observation depth of the XPS method, the measured value is considered to reflect the ratio of the number of nitrogen atoms observed at a depth of up to approximately 1 nm from the outermost surface. In the present application, the outer layer indicates a surface portion as deep as 1 nm from the outermost surface of the layer. There were four sections to be measured using the XPS method, which were located at every 90 degrees at a radius of 22 mm in the vicinity of an intermediate periphery of the substrate.

Film Thickness of Each Layer Other than the Lubricating Layer:

The film thickness of each layer was obtained using X-ray fluorescence analysis (XRF) in which a fluorescence X-ray, generated by radiating an X-ray, was analyzed by spectroscopy. In order to perform the XRF, calibration between the film thicknesses previously measured by cross-sectional observation with a transmission electron microscope (TEM) was performed.

Crystallinity:

The crystallinity of each magnetic recording medium was obtained by X-ray diffraction analysis (XRD).

Thickness of the Lubricating Layer 5:

Fourier-transform infrared spectroscopy (FT-IR) was used to obtain the thickness of the lubricating layer 5 based on the difference between the value obtained prior to the formation of the lubricating layer and the value obtained after the formation of the lubricating layer. The thickness is an average value measured at a measurement spot diameter of $\phi 1$ mm. There were four sections to be measured, which were located at every 90 degrees at a radius of 22 mm in the vicinity of the intermediate periphery of the substrate.

Thinness of the Protective Layer:

When the entire film thickness of the protective layer of each magnetic recording medium was 2.5 nm or less, it was determined that each magnetic recording medium has passed the tests (O). When the entire film thickness of the protective layer exceeded 2.5 nm, it was determined that each magnetic recording medium failed the tests (x).

Flyability Test on the Magnetic Head:

A flyability test was performed using each magnetic recording medium after the completion of the tape burnishing treatment. Specifically, a glide head on which a piezoelectric sensor is mounted is glided at a linear velocity of 8.6 m/sec, and the piezoelectric sensor is caused to detect a collision between the glide head and a protruding object on the surface of each magnetic recording medium when the protruding object is taller than the flying height of the glide head. At this moment, when the glide head output detected by the piezoelectric sensor is greater than a specified value even at one section on the surface of each magnetic recording medium, then the magnetic recording medium is considered defective. When a voltage value of the glide head output is equal to or lower than 100 mV, which is the level required for ensuring the reliability, over the entire scan range, it is determined that the magnetic recording medium has passed the test (O). The voltage value of equal to or less than 50 mV is determined as a preferred range (⊙). When the voltage value exceeds 100 mV, it is determined that the magnetic recording medium has failed the test (x).

Corrosion Resistance Test:

Each magnetic recording medium sample, obtained prior to the formation of the lubricating layer therein, was evaluated by putting a drop of acid on the surface of the magnetic recording medium. Because the magnetic layer 3 contains a Co-based alloy, resistivity in the corrosion resistance of each magnetic recording medium were determined by evaluating the amount of Co dissolved in the acid through the protective layer 4. Specifically, nitric acid, the volume concentration of which was 3%, was dropped in an amount of 0.8 ml onto a horizontally-placed sample obtained prior to the formation of the lubricating layer. The resultant product was left for one hour at room temperature. Thereafter, the entire amount of this fluid was recovered. Then, the amount of Co in the fluid was measured by means of inductively coupled plasma mass spectrometry (ICP-MS). A Co elution amount per unit area was obtained by dividing the measured Co elution amount by the area on the surface of each magnetic recording medium with which the dripped fluid came into contact.

Criteria for determining the corrosion resistance were as follows: when the Co elution amount per unit area is equal to or less than 5 $ng/cm^2$, at which no problems had ever occurred in a hard disk drive from past experience, it was determined that the magnetic recording medium has passed the test (O); the Co elution amount per unit area of equal to or less than 1 $ng/cm^2$ is considered preferable (⊙); and it is determined that the magnetic recording medium has failed the test when the Co elution amount per unit area exceeded 5 $ng/cm^2$.

Comprehensive Evaluation:

The magnetic recording media which have passed in the thinness of the protective layers, the flyability test on the magnetic head, and the corrosion resistance test were evaluated comprehensively and determined as "passed (O or ⊙)," and the rest of the recording media were considered "failed (x)." Of the magnetic recording media that have passed all these tests, the ones that fell in the preferred range (⊙) in the flyability test on the magnetic head and the corrosion resistance test were comprehensively evaluated and determined as "passed (⊙)."

Manufacturing Example 1

Manufacturing the Magnetic Recording Media (Examples 1 to 3, Comparative Examples 1 to 3):

A method for manufacturing the magnetic recording media samples of the present invention is now described. See FIGS. 1 and 3 and Table 1.

Figure 3:
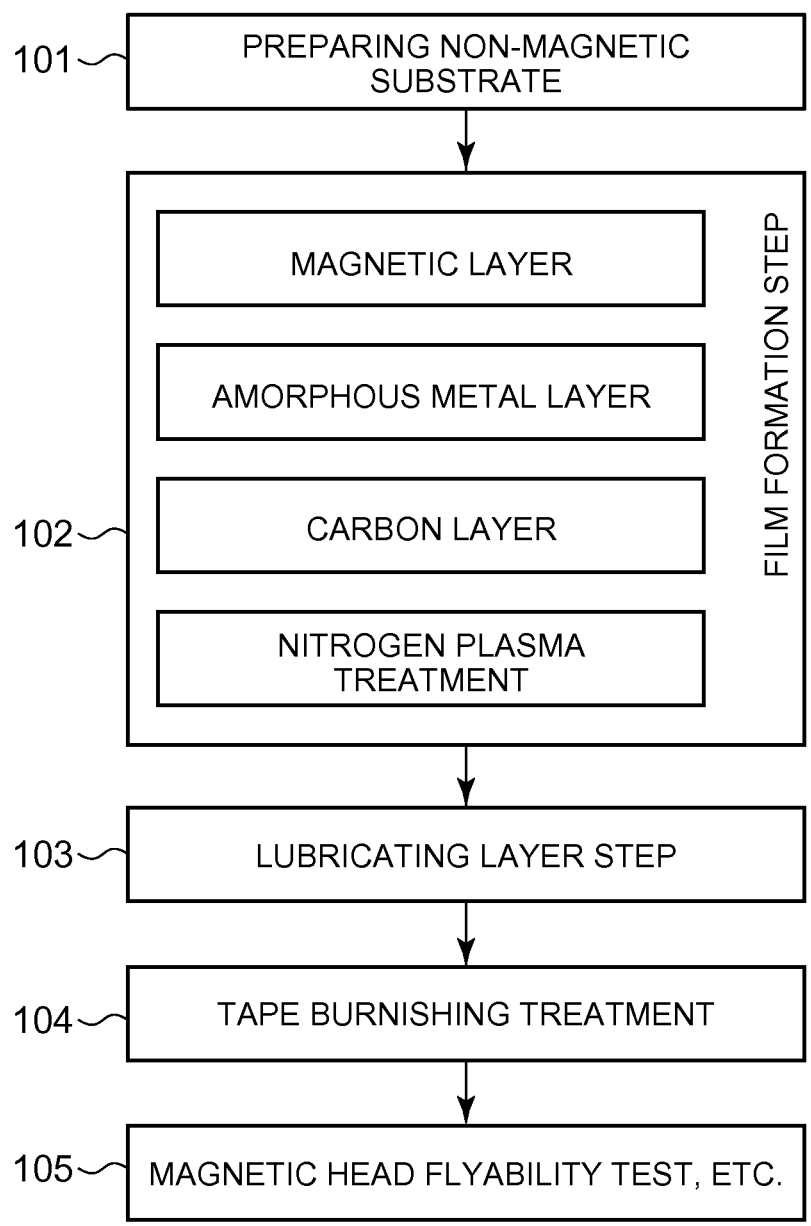
FIG. 3 is a process chart showing an example of a process of manufacturing the magnetic recording medium according to the present invention.

FIG. 3 shows an example of a process of manufacturing the magnetic recording medium used in the present invention. FIG. 1 shows the manufactured magnetic recording medium.

(1) First, a non-magnetic substrate was prepared (101). A 2.5-inch diameter donut-shaped glass disk that was polished and cleansed to have a surface roughness Ra (arithmetic mean roughness (JIS B0601; 2001)) of approximately 0.1 nm was used as the non-magnetic substrate.

(2) Next, a film formation step was executed (102). In the film formation step, the magnetic layer 3 made of metal was stacked on the non-magnetic substrate 2 by means of a sputtering method in a film forming device kept in a vacuum. First, a CrTi film of 10 nm in thickness was formed, and then a Ru film of 5 nm in thickness was formed thereon. Further, a CoCrPt—$SiO_2$ of 20 nm in thickness was formed thereon.

(3) Subsequently to the formation of the magnetic layer 3, an amorphous metal layer 41 was formed similarly in the film device kept in a vacuum. Ar gas, which is inert gas, was introduced at a flow rate of 20 sccm to a film forming chamber attached with a Si target, and a Si film was formed using a DC sputtering system at a pressure of 0.5 Pa and a DC power level of 150 W. The film thickness of the amorphous metal layer was controlled to 0.3 to 0.6 nm by adjusting the time required for forming the layer.

Note that the unit "sccm" used herein indicates the flow rate per minute (unit $cm^3$) in a standard state (1 atm, 0° C.). The same is true hereinafter.

(4) Next, a carbon layer 42 was formed similarly in the film forming device kept in a vacuum. Specifically, with an ECWR method using ethylene as a source, the carbon layer was formed at a power level of 1000 W and a pressure of 0.1 Pa. Note that the film thickness of the carbon layer was controlled to 1.6 to 1.9 nm by adjusting the time required for forming the layer.

(5) Thereafter, nitrogen gas is introduced to an ECWR plasma source in Examples 1 to 3 and Comparative Examples 2 and 3 shown in Table 1, to perform the nitrogen plasma treatment on the surface of the carbon layer at an RF power level of 500 W and a pressure of 0.1 Pa for 0.2 to 1.5 seconds, and nitrogen atoms were introduced to the surface of the carbon layer such that the ratio of the number of nitrogen atoms to a total number of carbon atoms, nitrogen atoms, and oxygen atoms becomes 19 atomic % at most. The ratio of the number of nitrogen atoms was controlled by adjusting the time required for the nitrogen plasma treatment.

Note that such nitrogen treatment was not conducted in Comparative Example 1 shown in Table 1.

(6) Next, the magnetic recording medium was removed from the film forming device kept in a vacuum, and a lubricating layer step is performed to form the lubricating layer 5 on the surface of the sample that has been subjected to the film formation step (103). Specifically, a perfluoropolyether (PEPE)-based liquid lubricant (Z-Tetraol manufactured by Solvay Solexis) was applied to the magnetic recording medium by means of a dip-coating method, which was then left in a 100° C. furnace for 30 minutes. Note that the thickness of the lubricating layer changes depending on the condition of the surface of the sample, such as a nitridation state. Therefore, all of the samples were formed such that the average film thickness thereof becomes 1.0 nm by adjusting the dip coating withdrawal speed to 0.5 to 5 mm/sec.

(7) Next, the tape burnishing treatment was performed on the surface of the lubricating layer (104). The tape burnishing treatment is a step of removing the dirt adhering to the surface of the magnetic recording medium and the microprojections on the same. Specifically, the dirt and microprojections on the surface of the magnetic recording medium were removed by scanning the entire surface of the magnetic recording medium using a burnishing tape that has abrasive grains having a grain size of #6000.

The configurations of the protective layers of Examples 1 to 3 and Comparative Examples 1 to 3, which are the samples of magnetic recording media manufactured according to (1) to (7) described above, are shown in Table 1.

TABLE 1

| | Protective Layer | Amorphous metal layer | | Carbon layer | |
|---|---|---|---|---|---|
| | Film thickness (nm) | Material | Film thickness (nm) | Film thickness (nm) | Amount of nitrogen (atomic %) |
| Example 1 | 2.2 | Si | 0.3 | 1.9 | 3 |
| Example 2 | 2.3 | Si | 0.5 | 1.8 | 12 |
| Example 3 | 2.0 | Si | 0.4 | 1.6 | 14 |
| Comparative Example 1 | 2.1 | Si | 0.5 | 1.6 | 0 |
| Comparative Example 2 | 2.3 | Si | 0.6 | 1.7 | 16 |
| Comparative Example 3 | 2.4 | Si | 0.5 | 1.9 | 19 |

Evaluation Example 1

Evaluation Results (Examples 1 to 3, Comparative Examples 1 to 3):

Table 2 shows the results of evaluating the two-layered protective layer samples of carbon/Si having a total film thickness of 2.5 nm or less, which were manufactured in a manner described above.

TABLE 2

| | Thinness of protective layer | Magnetic head flyability | Corrosion resistance | Comprehensive determination |
|---|---|---|---|---|
| Example 1 | ○ | ○ | ○ | ○ |
| Example 2 | ○ | ○ | ⊙ | ○ |
| Example 3 | ○ | ○ | ⊙ | ○ |
| Comparative Example 1 | ○ | X | ○ | X |
| Comparative Example 2 | ○ | ○ | X | X |
| Comparative Example 3 | ○ | ○ | X | X |

XRD evaluation confirmed that only CoCrPt crystal peaks were observed and that the Si and carbon of each protective layer were amorphous with no crystal peaks.

Comparative Example 1, in which the nitrogen treatment was not performed, has failed the magnetic head flyability test; thus, sufficient flyability could not be obtained. Examples 1 to 3 and Comparative Examples 2 and 3, in each of which the nitrogen treatment was performed and the amount of nitrogen was 3 atomic % or more, have passed the magnetic head flyability test.

On the other hand, Examples 1 to 3 and Comparative Example 1, in each of which the amount of nitrogen was 14 atomic % or less, have passed the corrosion resistance test. Especially in Examples 2 and 3 where the amount of nitrogen was 12 to 14 atomic %, the Co elution amount was 1 ng or lower.

As described above, in the samples having a total protective layer film thickness of 2.5 nm or less, it was confirmed that the amount of nitrogen in the outer layer of each protective layer had a large impact on the magnetic head flyability and the corrosion resistance and that it is preferred that the amount of nitrogen be 14 atomic % or less.

Manufacturing Example 2

Manufacturing the Magnetic Recording Media (Comparative Examples 4 to 9):

The magnetic recording media were manufactured in the same manner as in Manufacturing Example 1, except for the configurations of the protective layers.

Each protective layer was configured without forming the amorphous metal layer but by forming only the carbon layer. Specifically, the carbon layer 42 was formed into a thickness of 2.1 to 2.8 nm in the same film formation conditions as those of Manufacturing Example 1 in the film forming device kept in a vacuum, by adjusting the time required for forming the carbon layer.

Table 3 shows the configurations of the protective layers according to Comparative Examples 4 to 9, which are the samples of manufactured magnetic recording media.

TABLE 3

| | Protective Layer | Amorphous metal layer | | Carbon layer | |
|---|---|---|---|---|---|
| | Film thickness (nm) | Material | Film thickness (nm) | Film thickness (nm) | Amount of nitrogen (atomic %) |
| Comparative Example 4 | 2.1 | — | — | 2.1 | 0 |
| Comparative Example 5 | 2.4 | — | — | 2.4 | 6 |
| Comparative Example 6 | 2.2 | — | — | 2.2 | 15 |
| Comparative Example 7 | 2.6 | — | — | 2.6 | 0 |
| Comparative Example 8 | 2.8 | — | — | 2.8 | 6 |
| Comparative Example 9 | 2.7 | — | — | 2.7 | 16 |

Evaluation Example 2

Evaluation Results (Comparative Examples 4 to 9, Table 4):

In the same manner as in Evaluation Example 1, the magnetic head flyability and the corrosion resistance were tested with the magnetic recording media obtained in the comparative examples. Table 4 shows the evaluation results according to Comparative Example 4 to 9.

TABLE 4

| | Thinness of protective layer | Magnetic head flyability | Corrosion resistance | Comprehensive determination |
|---|---|---|---|---|
| Comparative Example 4 | ○ | X | X | X |
| Comparative Example 5 | ○ | X | X | X |
| Comparative Example 6 | ○ | X | X | X |
| Comparative Example 7 | X | X | ○ | X |
| Comparative Example 8 | X | ○ | ○ | X |
| Comparative Example 9 | X | ○ | ○ | X |

Comparative Examples 4 to 6, in which the film thickness of each single-layered protective film was 2.5 nm or less, have failed the magnetic head flyability test and the corrosion resistance test.

Compared to the results shown in Table 2 (Examples 1 to 3, Comparative Examples 1 to 3), it was confirmed that amorphous Si needed to be formed in each amorphous metal layer in order to reduce the film thickness of the entire protective film to 2.5 nm or less.

Moreover, Comparative Examples 8 and 9, in which the nitrogen treatment was performed on the protective films having a conventional film thickness greater than 2.5 nm, have passed the magnetic head flyability test and the corrosion resistance test. Comparative Example 7, in which the nitrogen treatment was not performed, has passed the corrosion resistance test but failed the magnetic head flyability test. The carbon protective films that were formed under the present conditions each had a high $sp^3$ bonding ratio and corrosion resistance but had poor bonding to the lubricant unless the nitrogen treatment was performed. It is, therefore, considered that the magnetic head flyability become unstable due to the fact that the lubricant has tendency of uneven coating and that the unbonded lubricant adheres easily to the magnetic head.

As described above, with regard to the carbon layer with high corrosion resistance, it is confirmed that nitrogen needs to be introduced to the carbon outer layer in order to ensure the magnetic head flyability.

Manufacturing Example 3

Manufacturing the Magnetic Recording Media (Examples 4 to 21, Comparative Examples 10 to 34):

Samples of magnetic recording media according to Examples 4 to 21 and Comparative Examples 10 to 34 were manufactured in the same manner as in Manufacturing Example 1, except for the configurations of the protective layers.

Each protective layer was configured by forming amorphous Si into a thickness of 0 to 3.5 nm as the amorphous metal layer and forming amorphous carbon into a thickness of 0 to 3.5 nm as the carbon layer. Specifically, as with the formation of the magnetic layers, an amorphous metal layer 41 and carbon layer 42 were formed into predetermined thicknesses in the film forming device kept in a vacuum, by adjusting the time required for forming each of the layers.

Note that the nitrogen plasma treatment was performed on all of the samples such that the amount of nitrogen therein becomes 10 to 14 atomic %.

Table 5 shows the configurations of the protective layers according to Examples 4 to 21 and Comparative Examples 10 to 34, which are the manufactured samples of magnetic recording media.

TABLE 5-1

| | Protective Layer | Amorphous metal layer | | Carbon layer |
|---|---|---|---|---|
| | Film thickness (nm) | Material | Film thickness (nm) | Film thickness (nm) |
| Example 4 | 2.3 | Si | 0.3 | 2.0 |
| Example 5 | 1.8 | Si | 0.3 | 1.5 |
| Example 6 | 1.3 | Si | 0.3 | 1.0 |
| Example 7 | 1.0 | Si | 0.3 | 0.7 |
| Example 8 | 2.5 | Si | 0.5 | 2.0 |
| Example 9 | 2.0 | Si | 0.5 | 1.5 |
| Example 10 | 1.5 | Si | 0.5 | 1.0 |
| Example 11 | 1.0 | Si | 0.5 | 0.5 |
| Example 12 | 1.0 | Si | 0.7 | 0.3 |
| Example 13 | 2.5 | Si | 1.0 | 1.5 |
| Example 14 | 2.0 | Si | 1.0 | 1.0 |
| Example 15 | 1.5 | Si | 1.0 | 0.5 |
| Example 16 | 1.3 | Si | 1.0 | 0.3 |
| Example 17 | 2.5 | Si | 1.5 | 1.0 |
| Example 18 | 2.0 | Si | 1.5 | 0.5 |
| Example 19 | 1.8 | Si | 1.5 | 0.3 |
| Example 20 | 2.5 | Si | 2.0 | 0.5 |
| Example 21 | 2.3 | Si | 2.0 | 0.3 |

TABLE 5-2

| | Protective Layer | Amorphous metal layer | | Carbon layer |
|---|---|---|---|---|
| | Film thickness (nm) | Material | Film thickness (nm) | Film thickness (nm) |
| Comparative Example 10 | 3.5 | — | — | 3.5 |
| Comparative Example 11 | 3.0 | — | — | 3.0 |

TABLE 5-2-continued

| | Protective Layer | Amorphous metal layer | | Carbon layer |
|---|---|---|---|---|
| | Film thickness (nm) | Material | Film thickness (nm) | Film thickness (nm) |
| Comparative Example 12 | 2.5 | — | — | 2.5 |
| Comparative Example 13 | 2.0 | — | — | 2.0 |
| Comparative Example 14 | 1.5 | — | — | 1.5 |
| Comparative Example 15 | 1.0 | — | — | 1.0 |
| Comparative Example 16 | 0.5 | — | — | 0.5 |
| Comparative Example 17 | 3.3 | Si | 0.3 | 3.0 |
| Comparative Example 18 | 2.8 | Si | 0.3 | 2.5 |
| Comparative Example 19 | 0.8 | Si | 0.3 | 0.5 |
| Comparative Example 20 | 2.8 | Si | 0.5 | 2.5 |
| Comparative Example 21 | 0.8 | Si | 0.5 | 0.3 |
| Comparative Example 22 | 0.5 | Si | 0.5 | — |
| Comparative Example 23 | 3.0 | Si | 1.0 | 2.0 |
| Comparative Example 24 | 1.0 | Si | 1.0 | — |
| Comparative Example 25 | 3.0 | Si | 1.5 | 1.5 |
| Comparative Example 26 | 1.5 | Si | 1.5 | — |
| Comparative Example 27 | 3.0 | Si | 2.0 | 1.0 |
| Comparative Example 28 | 2.0 | Si | 2.0 | — |
| Comparative Example 29 | 3.0 | Si | 2.5 | 0.5 |
| Comparative Example 30 | 2.8 | Si | 2.5 | 0.3 |
| Comparative Example 31 | 2.5 | Si | 2.5 | — |
| Comparative Example 32 | 3.3 | Si | 3.0 | 0.3 |
| Comparative Example 33 | 3.0 | Si | 3.0 | — |
| Comparative Example 34 | 3.5 | Si | 3.5 | — |

Evaluation Example 3

Evaluation Results (Examples 4 to 21, Comparative Examples 10 to 34)

In the same manner as in Evaluation Example 1, the magnetic head flyability and the corrosion resistance were tested on each of the samples of magnetic recording media.

Figure 4:
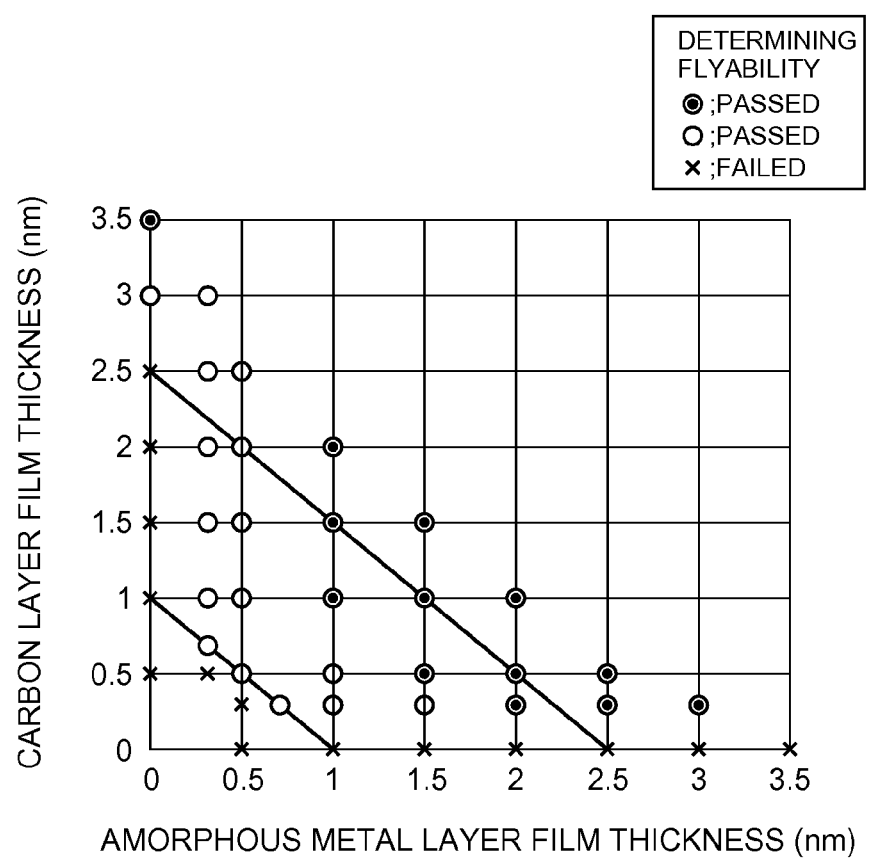
FIG. 4 is a graph showing evaluation results of magnetic head flyability according to Evaluation Example 3.

Table 6 shows the evaluation results. FIG. 4 shows the results of evaluating the magnetic head flyability, and FIG. 5 the results of evaluating the corrosion resistance.

TABLE 6-1

| | Thinness of protective layer | Magnetic head flyability | Corrosion resistance | Comprehensive determination |
|---|---|---|---|---|
| Example 4 | ○ | ○ | ⊙ | ○ |
| Example 5 | ○ | ○ | ⊙ | ○ |
| Example 6 | ○ | ○ | ○ | ○ |
| Example 7 | ○ | ○ | ○ | ○ |
| Example 8 | ○ | ○ | ⊙ | ○ |
| Example 9 | ○ | ○ | ⊙ | ○ |
| Example 10 | ○ | ○ | ○ | ○ |
| Example 11 | ○ | ○ | ○ | ○ |
| Example 12 | ○ | ○ | ○ | ○ |
| Example 13 | ○ | ⊙ | ⊙ | ⊙ |
| Example 14 | ○ | ⊙ | ○ | ○ |
| Example 15 | ○ | ○ | ○ | ○ |
| Example 16 | ○ | ○ | ○ | ○ |
| Example 17 | ○ | ⊙ | ○ | ○ |
| Example 18 | ○ | ⊙ | ○ | ○ |
| Example 19 | ○ | ○ | ○ | ○ |
| Example 20 | ○ | ⊙ | ○ | ○ |
| Example 21 | ○ | ⊙ | ○ | ○ |

TABLE 6-2

| | Thinness of protective layer | Magnetic head flyability | Corrosion resistance | Comprehensive determination |
|---|---|---|---|---|
| Comparative Example 10 | X | ⊙ | ⊙ | X |
| Comparative Example 11 | X | ○ | ○ | X |
| Comparative Example 12 | ○ | X | X | X |
| Comparative Example 13 | ○ | X | X | X |
| Comparative Example 14 | ○ | X | X | X |
| Comparative Example 15 | ○ | X | X | X |
| Comparative Example 16 | ○ | X | X | X |
| Comparative Example 17 | X | ○ | ⊙ | X |
| Comparative Example 18 | X | ○ | ⊙ | X |
| Comparative Example 19 | ○ | X | X | X |
| Comparative Example 20 | X | ○ | ⊙ | X |
| Comparative Example 21 | ○ | X | X | X |
| Comparative Example 22 | ○ | X | X | X |
| Comparative Example 23 | X | ⊙ | ⊙ | X |
| Comparative Example 24 | ○ | X | X | X |
| Comparative Example 25 | X | ⊙ | ⊙ | X |
| Comparative Example 26 | ○ | X | X | X |
| Comparative Example 27 | X | ⊙ | ○ | X |
| Comparative Example 28 | ○ | X | X | X |
| Comparative Example 29 | X | ⊙ | ○ | X |
| Comparative Example 30 | X | ⊙ | ○ | X |
| Comparative Example 31 | ○ | X | X | X |
| Comparative Example 32 | X | ⊙ | ○ | X |

TABLE 6-2-continued

|  | Thinness of protective layer | Magnetic head flyability | Corrosion resistance | Comprehensive determination |
|---|---|---|---|---|
| Comparative Example 33 | X | X | X | X |
| Comparative Example 34 | X | X | X | X |

(1) When the protective layer is single layered (Comparative Examples 10 to 16, 22, 24, 26, 28, 31, 33, 34)

Comparative Examples 10 to 16, in each of which the protective layer was configured by a carbon single layer without the amorphous metal layer, have failed the magnetic head flyability test and the corrosion resistance test with the film thickness of 2.5 nm or less, but have passed the magnetic head flyability test and the corrosion resistance test with the film thickness of 3.0 nm or more.

Furthermore, Comparative Examples 22, 24, 26, 28, 31, 33, 34, in each of which the protective layer was configured by the amorphous Si single layer without the carbon layer, have failed the magnetic head flyability test and the corrosion resistance test with all film thicknesses.

In other words, it is clear that the film thickness of the carbon single layer needs to be 3.0 nm or more.

(2) When each protective layer is two-layered (Examples 4 to 21, Comparative Examples 17 to 21, 23, 25, 27, 29, 30, 32)

Comparative Examples 19, 21, in each of which the total thickness of the protective layer was 0.8 nm, have failed the magnetic head flyability test and the durability test. However, the samples in which the total thickness was 1.0 nm or more have passed both the magnetic head flyability test and the durability test. See Examples 4 to 21 and Comparative Examples 17, 18, 20, 23, 25, 27, 29, 30, and 32.

In other words, in each two-layered protective film in which the amorphous metal layer made of amorphous Si has a thickness of 0.3 nm or more and the carbon layer made of amorphous carbon has a thickness of 0.3 nm or more, the magnetic head flyability and the corrosion resistance can be ensured even when the total film thickness is 2.5 nm or less, as long as the total film thickness is 1.0 nm or more.

Figure 5:
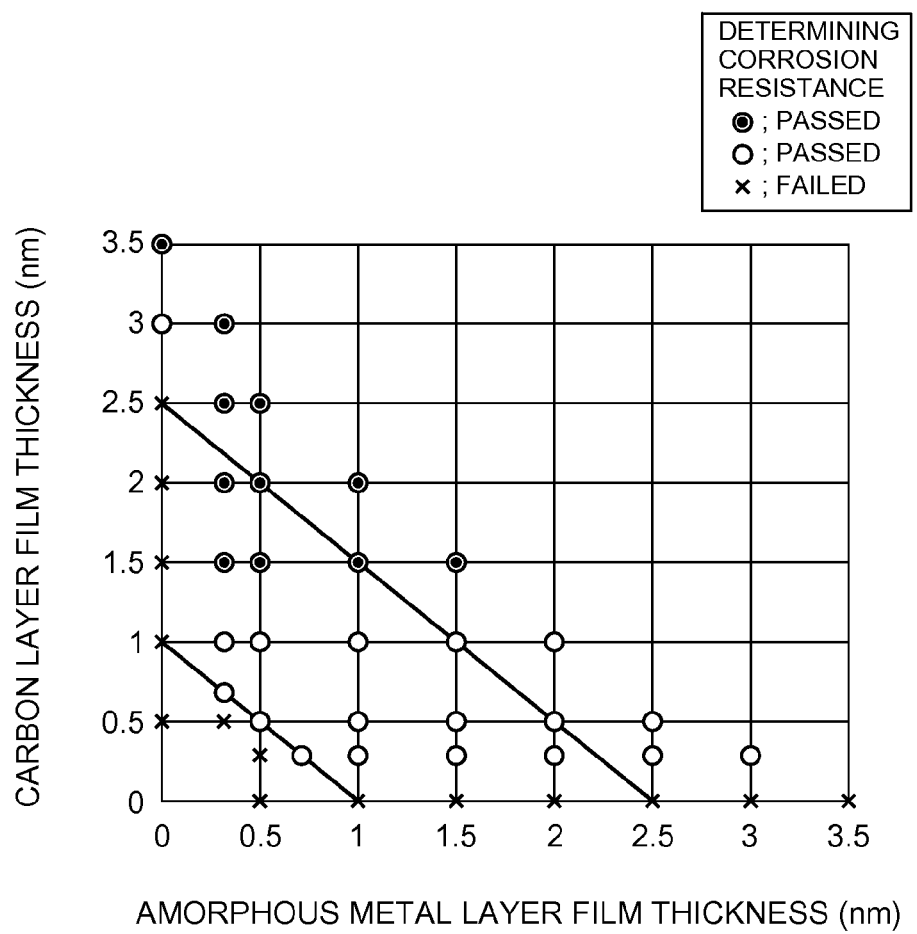
FIG. 5 is a graph showing evaluation results of corrosion resistance of the magnetic recording medium according to Evaluation Example 3.

In terms of the magnetic head flyability, the film thickness of the amorphous metal layer generating a glide head output of 50 mV or less (◯) is preferably 1.0 nm or more, as shown in FIG. 4. In terms of the corrosion resistance, the film thickness of the carbon layer generating a Co elution amount of 1 ng/cm$^2$ (◯) is preferably 1.5 nm or more, as shown in FIG. 5. It is more preferred that the thickness of the amorphous metal layer of amorphous Si be 1.0 nm and that the thickness of the carbon layer made of amorphous carbon be 1.5 nm.

Manufacturing Example 4

Manufacturing Magnetic Recording Media (Examples 22 to 31):

The magnetic recording media were manufactured in the same manner as in Manufacturing Example 1, except for the configurations of the protective layers.

Ten samples using the following elements for the respective amorphous metal layers were manufactured to configure the protective layers: Al, Ge, Ti, Zr, Hf, V, Nb, Ta, Cr, and W.

The amorphous metal layer is formed into a thickness of 0.3 to 0.6 nm. As the carbon layer, an amorphous carbon layer was formed into a thickness of 1.6 to 1.9 nm in the same manner as in Manufacturing Example 1. Furthermore, nitrogen plasma treatment was performed on all of the samples such that the nitrogen amount thereof becomes 10 to 14 atomic %.

Evaluation Example 4

Evaluation Results (Examples 22 to 31):

The crystallinity, the magnetic head flyability, and the corrosion resistance of each magnetic recording medium were tested in the same manner as in Evaluation Example 1.

XRD measurement confirmed that there were no peaks other than those corresponding to the magnetic layers of all samples and that all of the protective layers were configured by amorphous.

All of the manufactured samples have passed the magnetic head flyability test and the corrosion resistance test.

Especially when Ti was used for forming the amorphous metal layer, the Co elution amount was 1 ng/cm$^2$ or less, as with Examples 2 and 3 in which Si was used for forming the amorphous metal layer. This indicates that the corrosion resistance is particularly good. When W was used for forming the amorphous metal layer, the glide head output was 50 mV or less, which means that the magnetic head flyability were particularly good.

Manufacturing Example 5

Manufacturing Magnetic Recording Media (Examples 32 to 37):

The magnetic recording media were manufactured in the same manner as in Manufacturing Example 1, except for the configurations of the protective layers.

These examples have manufactured samples of magnetic recording media in which oxygen, nitrogen, and carbon were added in small amounts to Si or Ti for forming the amorphous metal layers.

In Examples 32 and 35, gas obtained by adding 5 vol % nitrogen to argon was used as process gas in order to sputter Si or Ti.

In Examples 34 and 37, gas obtained by adding 5 vol % oxygen to argon was used as process gas in order to sputter Si or Ti.

In Example 33, a Si target added with 3 vol % carbon was used in order to perform sputtering on the amorphous metal layer.

In Example 36, a Ti target added with 3 vol % carbon was used in order to performing sputtering on the amorphous metal layer. These amorphous metal layers all have a thickness of 0.3 to 0.5 nm.

The carbon layers were formed into a thickness of 1.6 to 1.9 nm, as with Manufacturing Example 1. In addition, all of the samples were subjected to the nitrogen plasma treatment such that the amount of nitrogen in each sample becomes 10 to 14 atomic %.

Table 7 shows the configurations of the protective layers of Examples 32 to 37, which are the manufactured samples of magnetic recording media.

TABLE 7

| | Protective Layer | Amorphous metal layer | | Carbon layer | |
|---|---|---|---|---|---|
| | Film thickness (nm) | Material | Film thickness (nm) | Film thickness (nm) | Amount of nitrogen (atomic %) |
| Example 32 | 2.1 | Si + N | 0.5 | 1.6 | 12 |
| Example 33 | 2.3 | Si + C | 0.4 | 1.9 | 11 |

TABLE 7-continued

|  | Protective Layer | Amorphous metal layer | | Carbon layer | |
|---|---|---|---|---|---|
|  | Film thickness (nm) | Material | Film thickness (nm) | Film thickness (nm) | Amount of nitrogen (atomic %) |
| Example 34 | 2.3 | Si + O | 0.5 | 1.8 | 11 |
| Example 35 | 2.0 | Ti + N | 0.4 | 1.6 | 12 |
| Example 36 | 2.2 | Ti + C | 0.3 | 1.9 | 11 |
| Example 37 | 2.4 | Ti + O | 0.5 | 1.9 | 10 |

Evaluation Example 5

Evaluation Results (Examples 32 to 37):

The crystallinity, the magnetic head flyability, and the corrosion resistance of each magnetic recording medium were tested in the same manner as in Evaluation Example 1.

The results are shown in Table 8.

TABLE 8

|  | Thinness of protective layer | Magnetic head flyability | Corrosion resistance | Comprehensive determination |
|---|---|---|---|---|
| Example 32 | ○ | ⊙ | ⊙ | ⊙ |
| Example 33 | ○ | ○ | ⊙ | ○ |
| Example 34 | ○ | ⊙ | ○ | ○ |
| Example 35 | ○ | ⊙ | ⊙ | ⊙ |
| Example 36 | ○ | ○ | ⊙ | ○ |
| Example 37 | ○ | ⊙ | ○ | ○ |

XRD measurement confirmed that there were no peaks other than those corresponding to the magnetic layers of all samples and that all of the protective layers were configured by amorphous.

All of the manufactured samples have passed the magnetic head flyability test and the corrosion resistance test.

Especially in Examples 32 and 35 in which nitrogen was added to Si and Ti to obtain the amorphous metal layers, the total film thicknesses were only 2.1 nm and 2.0 nm, but the corrosion resistance and the magnetic head flyability were good. The Co elution amount was 1 ng/cm$^2$ or less, and the glide head output was 50 mV or less.

In Examples 33 and 36 in which carbon was added to Si and Ti to obtain the amorphous metal layers, good corrosion resistance was obtained, and the Co elution amount was 1 ng/cm$^2$ or less.

In Examples 34 and 37 in which oxygen was added to Si and Ti, good magnetic head flyability were obtained, and the glide head output was 50 mV or less.

What is claimed is:

1. A magnetic recording medium, comprising:
    a substrate having sequentially formed thereon, in the order recited,
    a magnetic layer;
    a protective layer having a thickness ranging from 1.0 nm to 2.5 nm and being comprised of:
    an amorphous metal layer formed on the magnetic layer and having a thickness of at least 0.3 nm, the amorphous metal layer being comprised of a metal selected from the group consisting of Si (silicon), Al (aluminum), Ge (germanium), Ti (titanium), Zr (zirconium), Hf (hafnium), V (vanadium), Nb (niobium), Ta (tantalum), Cr (chromium), Mo (molybdenum) and W (tungsten) that is in an amorphous state; and
    a carbon layer formed on the amorphous metal layer and having a thickness of at least 0.3 nm, the carbon layer comprising amorphous carbon; and
    a lubricating layer,
    wherein the carbon layer and the amorphous metal layer have respective surfaces that contact the lubricating layer, and
    wherein the carbon layer includes nitrogen atoms in a surface thereof in which a ratio of number of nitrogen atoms to total number of carbon atoms, nitrogen atoms, and oxygen atoms is 14 atomic % or less.

2. The magnetic recording medium according to claim 1, wherein the carbon layer is made of diamond-like carbon.

3. The magnetic recording medium according to claim 1, wherein the amorphous metal layer further comprises at least one of O (oxygen), C (carbon), and N (nitrogen).

* * * * *